INVENTOR.
HANS C. KLEIN
WILHELM KNAPP
BY Karl F. Ross
ATTORNEY

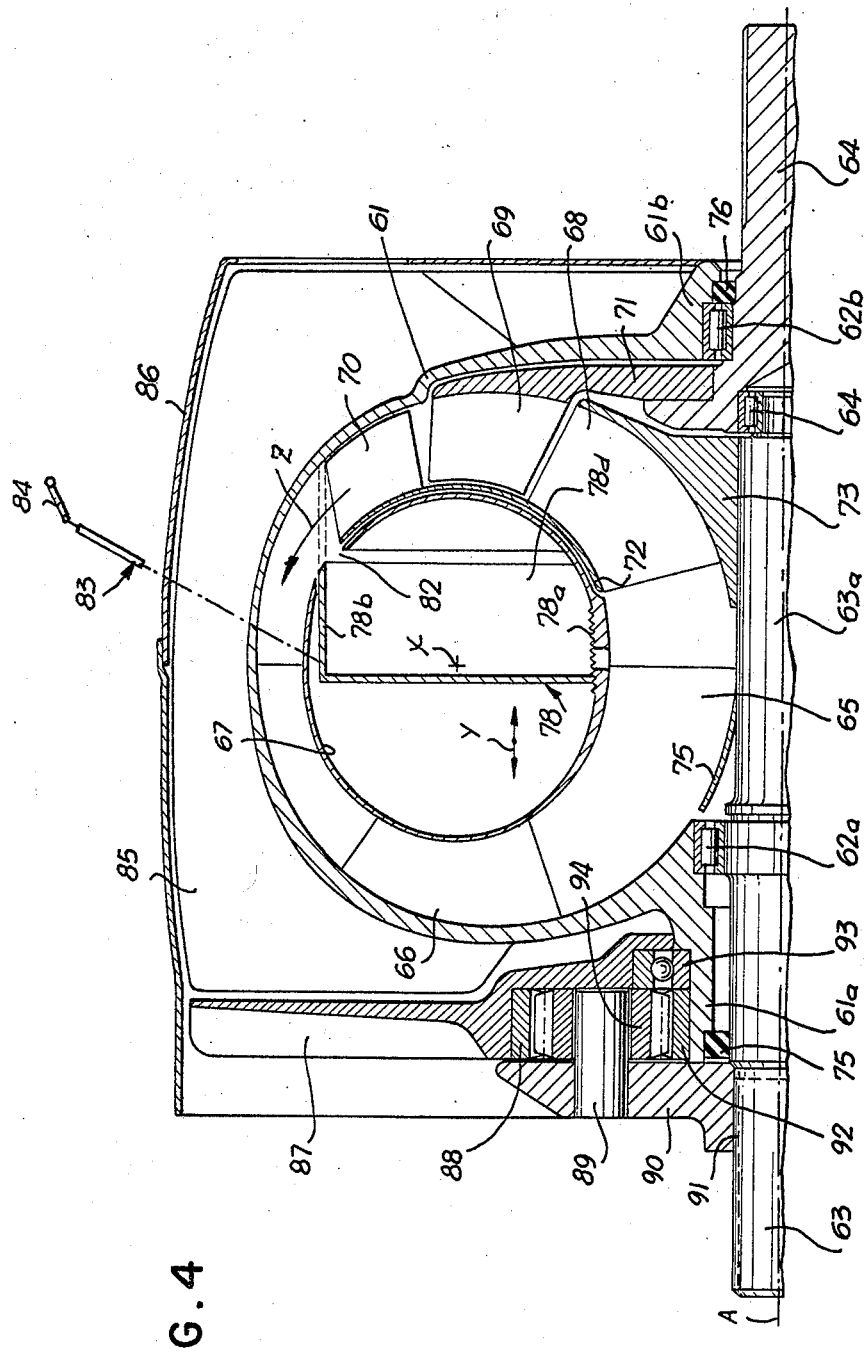

United States Patent Office 3,489,252
Patented Jan. 13, 1970

3,489,252
HYDRODYNAMIC BRAKE
Hans-Christof Klein, Hattersheim (Main), and Wilhelm Knapp, Bad Homburg vor der Hohe, Germany, assignors to Alfred Teves GmbH, Frankfurt am Main, Germany, a corporation of Germany
Filed Dec. 5, 1967, Ser. No. 688,139
Claims priority, application Germany, Dec. 6, 1966, T 32,688; Apr. 28, 1967, T 33,750
Int. Cl. F16d 57/00
U.S. Cl. 188—90      9 Claims

ABSTRACT OF THE DISCLOSURE

A hydrodynamic brake connected with the power train or wheels of an automatic vehicle in which confronting rotors are driven in opposite senses and have interleaved arrays of axially extending vanes circulating the hydrodynamic brake fluid along a closed path in heat-transferring relationship with air induced to flow along the outer wall of the pump housing by blowers connected with the rotor shafts. The decelerator effectiveness is controlled by providing the rotors as piston-and-cylinder arrangements adapted to shift the vanes toward and away from one another or by intercepting in a stepless manner the pumped liquid.

---

Our present invention relates to a hydrodynamic brake or decelerator for automotive vehicles.

It has already been proposed to provide hydrodynamic brakes or decelerators in the driving train of an automotive vehicle, i.e. between the engine and the driven wheels, to act as an auxiliary decelerating or braking device in conjunction with the usual wheel brakes. In such systems, a rotary pumping member, i.e. a rotor connected with the drive shaft of the vehicle, displaces a hydraulic fluid along a closed path including a heat exchanger designed to dissipate the heat of the fluid produced by conversion of the kinetic energy of rotation of the shaft into kinetic energy of heat of the fluid. The resulting deceleration of the shaft is proportional to the amount of heat generated in the fluid.

In such systems, e.g. as has been described in commonly assigned Patent Nos. 3,265,162 and 3,302,755 and in the commonly assigned copending applications Ser. Nos. 672,121 and 680,936 (now U.S. Patent No. 3,423,-134) filed Oct. 2, 1967 and Nov. 6, 1967 by Wilhelm Knapp, one of the present inventors, the principle of operation and some advantageous constructions of hydrodynamic decelerators of this type are described and claimed. Thus it is important to recognize that a hydrodynamic brake is most effective at high vehicle speeds and thus may be brought into play prior to the mechanical wheel brakes of the vehicle to effect an initial slowdown at speeds at which the mechanical brakes are rapidly worn out and are of little effectiveness. However, at low vehicle speeds, the pumping efficiency falls off and the hydrodynamic decelerator plays a less significant role in the braking process. In fact, hydrodynamic decelerators alone are frequently incapable of bringing the vehicle to standstill. Thus it has been suggested to provide additional friction brakes in the decelerator housing and to use a differential valve responsive to the braking effectiveness of the hydraulic decelerator to bring the friction brakes at the wheels or decelerator housing into play.

For the most part, earlier decelerator structures have required a relatively large-diameter stator, mounted upon the vehicle frame or chassis, cooperating a corresponding dimension rotor whose vanes or ribs cooperate to form the pump. The decelerator thus had the appearance of a torque convertor with a crown of vanes, the hydraulic fluid being pumped from the central region of the decelerator chamber to the periphery thereof. The rotor was generally coupled to the power shaft, while the heat exchanger was a radiator designed to dissipate the thermal energy of braking into the atmosphere directly, e.g. with the cooperation of a fan inducing the flow of air through the radiator or the vehicle movement with similar effect, or a liquid/liquid heat exchanger indirectly dissipating this thermal energy. Heat-exchanger systems of the latter type make use of the cooling system of the internal-combustion engine by passing the coolant thereof through the liquid/liquid heat exchanger to take up the heat of hydrodynamic fluid and eventually dissipate it into the atmosphere through the radiator of the engine. A thermostatic switch may be provided at the heat exchanger to terminate the flow of cooling fluid therethrough when, because of the extent of braking or road conditions affecting driving, the engine is about to overheat.

It has also been found, as described in the aforementioned applications, that problems were encountered in hydraulic decelerator in which residual fluid in the pumping chamber was displaced by the rotor in spite of the fact that the rotor chamber was not intended to be charged with fluid and hydrodynamic braking was undesired. To this end, these systems provide a charging cylinder containing hydraulic brake fluid below a gas head which could be alternatively subjected to pressurization from a compressor or to negative pressure from the intake side of the compressor. When superatmospheric pressure is supplied to the charging cylinder, the hydrodynamic fluid is driven under pressure from the charging cylinder into the rotor chamber and substantially immediately becomes effective to produce hydrodynamic deceleration. When negative pressure is applied to the cylinder, however, the hydrodynamic fluid is withdrawn from the rotor chamber which is substantially completely drained to prevent undesirable pumping action.

It will be recognized that the effectiveness of the hydrodynamic decelerator is determined by the volume of the liquid pumped and the energy which is transferred to the liquid in the form of heat, i.e. by the amount of work done by the rotor in the liquid. The pumping capacity of the rotor, however, is dependent upon the speed of the power shaft, which must be held within the limited range of speeds practical for automotive vehicle, and the diameter of the rotor. As a result, it is necessary to increase the diameter (and, accordingly, the peripheral speed of the vanes) whenever increased hydrodynamic braking is desired. This provides a limitation of the use of hydrodynamic decelerators and brakes since increase in the volume of the decelerator is often precluded by design of the vehicle, may become prohibitive, or may result in interference with other functioning parts. Thus it may be stated that a recognized disadvantage of the known hydrodynamic brakes is their spatial requirements for a given decelerating action.

It is, therefore, the principal object of our present invention to provide an improved hydrodynamic decelerator for heavy duty automotive vehicles and the like which requires a minimum of room for a maximum of decelerator activity and overcomes the disadvantages of earlier systems as described above.

Another object of this invention is to provide a hydrodynamic decelerator of high effectiveness and low bulk.

Still another object of our invention is to provide a hydrodynamic decelerator of high effectiveness and facility of control.

These objects and others which will become apparent hereinafter are attained, in accordance with the present invention, in a hydraulic decelerator adapted to circulate a liquid along a closed path to convert kinetic energy of rotation in the power train of a vehicle into kinetic energy of heat of the fluid and to dissipate such heat which has a pair of countermoving rotors driven in opposite senses and cooperating to increase the interaction of the rotor vanes with the liquid above the relationship characteristic of a single rotor device. According to a more specific feature of this invention, the rotors are coaxial with one another and have interfitable arrays of vanes, preferably extending axially toward one another, each of the arrays being made up of angularly equispaced vanes, the arrays being radially offset from one another with respect to the axis of the device. We have found that an arrangement in which counterrotating interfitting arrays of vanes form the pump assembly permits hydrodynamic braking to a high degree with a much more compact configuration of the assembly. Moreover, the assembly permits the heat-dissipating means to be formed integrally with the pump unit. To this end, we provide a heat-conductive housing around the rotor which defines therewith a heat-exchange chamber through which a coolant is induced to flow in heat-transferring relationship with the liquid circulated by the pumping rotors. Thus the device comprises blower means, advantageously driven by the rotating shaft structure, to induce the flow of air through the cooling jacket or heat exchanger.

According to still another feature of this invention, the rotor structures constitute piston-and-cylinder means for shifting the respective sets of vanes axially toward and away from one another to permit control of the effectiveness of the hydrodynamic brake. Also, the inner wall of the housing can be provided with vanes closely spaced with respect to the rotor assembly so as to form a diffuser structure through which the circulating liquid is forced to pass. Alternatively means can be provided to intercept the circulating liquid.

The above and other objects, features and advantages of the present invention will become more readily apparent from the following description, reference being made to the accompanying drawing, in which:

FIG. 4 is a fragmentary cross-sectional view showing another rotor assembly for a hydrodynamic brake or decelerator according to this invention.

Figure 1:
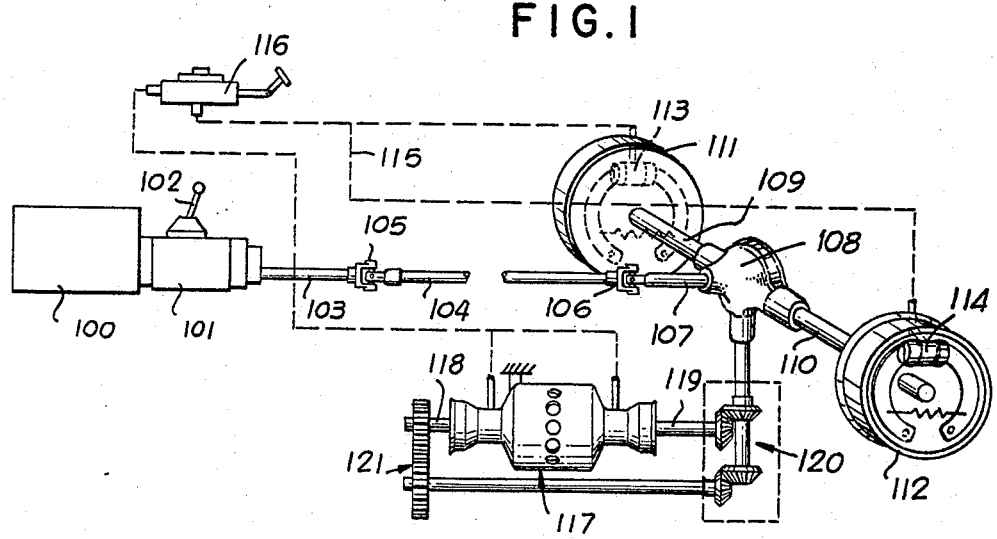
FIG. 1 is a diagram, partly in elevation, showing a hydrodynamic decelerator system embodying this invention.

FIG. 1 is a diagram showing the relationship of the hydrodynamic brake system to the remainder of the vehicle. The vehicle is here represented as having an internal-combustion engine 100 whose gear-change transmission 101 has a gear-shift lever 102 and is used in a heavy-duty automotive vehicle such as a truck. The output of the transmission 101 is a shaft 103 connected to the power shaft 104 by a universal joint 105 while another universal joint 106 connects the power shaft 104 to the input shaft 107 of a differential 108 whose output shafts 109 and 110 drive the rear wheels 111 and 112. The latter are shown to have hydraulically operated internal expanding brakes 113 and 114 supplied with brake fluid by transmission line 115 from a master cylinder 116. As described in connection with FIG. 2, the master cylinder may also operate the hydraulic decelerator 117. The hollow shafts of the latter are connected with the shafts 118 and 119 which are driven in opposite senses by a bevel-gear transmission 120 and a spur-gear assembly 121.

Figure 3:
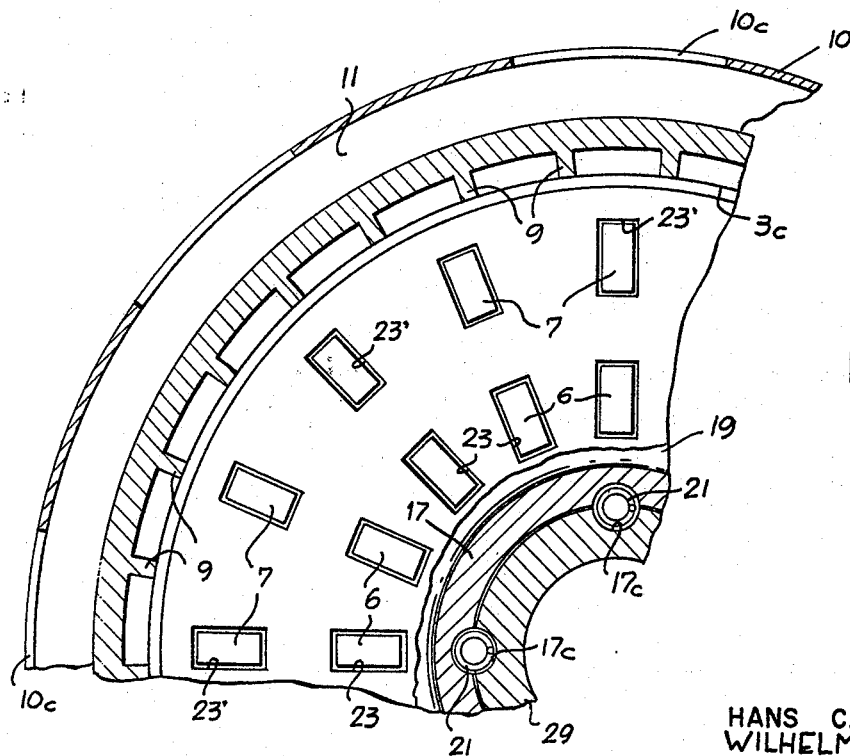
FIG. 3 is a cross-sectional view taken along the line III—III of FIG. 2.
Figure 2:
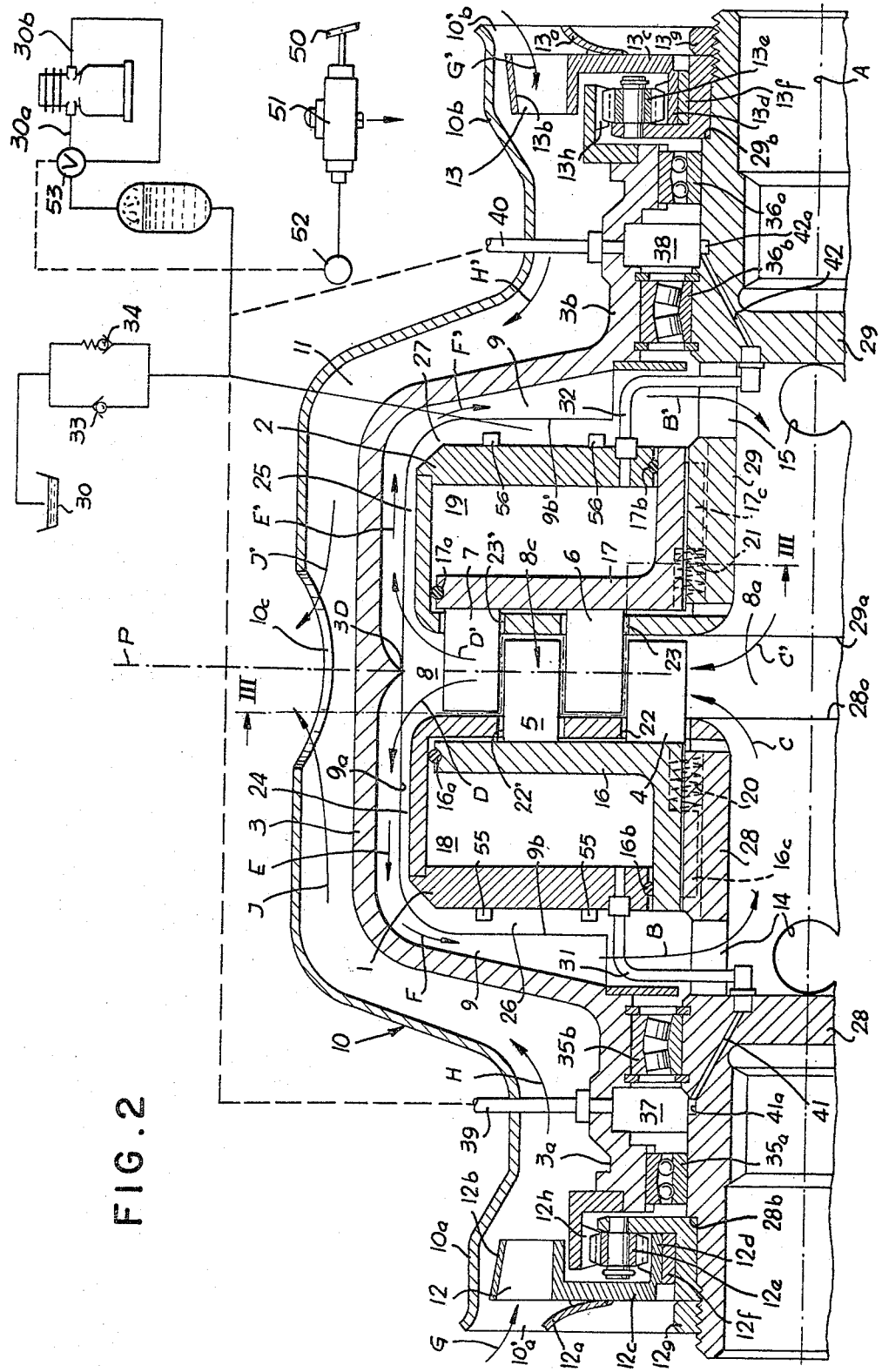
FIG. 2 is a partial axial cross-section drawn to an enlarged scale, showing the decelerator.

In FIGS. 2 and 3, we show the hydrodynamic-brake structure in enlarged axial cross section, only half being illustrated while the other half is identical and symmetrical thereto.

The brake comprises a housing 3 mounted on the vehicle body or chassis and thus stationary with respect to the power shaft. The housing 3 has a pair of axially extending sleeves 3a and 3b at its opposite longitudinal ends which receive bearings 35a, 35b and 36a, 36b rotatably supporting respective hollow shafts 28 and 29. The shafts carry respective pumping rotors generally designated 1 and 2 which are driven by the rear wheels of the vehicle via the transmission described in connection with FIG. 1 in opposite senses or directions. Rotor 1 carries an array of angularly spaced axially extending pumping vanes 4 which project in the direction of the other rotor 2 and are radially spaced from a further array 5 of angularly spaced vanes. Interleaved with the vanes 4 and 5, are respective arrays 6 and 7, radially spaced from one another, of complementary vanes 6 and 7 mounted upon the rotor 2 and extending axially in the direction of the first-mentioned rotor 1. The vanes 4, 5 and 6, 7 thus have the configuration of a Ljungström turbine. The rotors 1 and 2 define, together with housing 3, annular clearances or chambers 24 and 25 as well as a pumping chamber 8 in which the hydrodynamic-brake fluid is under pressure when the rotors are operated. Behind each of these rotors 1, 2 (which respect to the pressure chamber 8), further annular clearances 26 and 27, lying in planes transverse to the axis A of rotation of the rotors are provided. The hollow shafts 28 and 29 are formed with throttling orifices 14 and 15 which permit fluid flow in the direction of arrows B and B' radially into the interiors of the hollow shafts which open toward one another the 28a and 29a, respectively to define a low-pressure central zone 8a within the crowns of vanes 4, 5 and 6, 7. In the pressure zone 8a, the hydrodynamic brake fluid is diverted radially outwardly by centrifugal action as represented by arrows C and C' to flow radially through the annular zone 8c swept between vanes 4, 5 and 6, 7 into the outer annular pressure chamber 8. A ridge 3c along the inner wall of housing 3 in this chamber 8 deflects the radial stream of hydrodynamic liquid axially as represented by the arrows D and D' along divergent paths into the aforementioned annular chambers 24 and 25. In these chambers, the brake fluid flow is axial (arrows E and E') until the fluid is deflected radially inwardly (arrows F and F') toward the orifices 14 and 15 in chambers 26 and 27.

The inner wall of the housing 3 is provided with diffuser vanes generally represented at 9 and annular equispaced around the rotors 1, 2 while projecting radially inwardly toward the latter. Along the chambers 8, 24 and 25, the vanes 9 extend axially as represented at 9a at a radial height approximately equal to that of the ridge 3c while along within the chambers 26 and 27, the vanes 9 extend radially (as shown at 9b and 9b') with respect to the axis A.

The liquid-enclosing housing 3, whose interior forms the pumping chamber, is surrounded by a fixed casing 10 spaced from the housing structure 3 with all around clearances to define a cooling passage 11 therewith. At each axial end of the casing 10, outwardly flared axial portion 10a and 10b form intake openings for the cooling air which enters axially as represented by arrows G and G'. Bell-shaped deflectors 12a and 13a define the intake openings 10a' and 10b' which are thus annular mouths.

The air streams admitted through the openings 10a' and 10b' (arrows G and G') flow axially inwardly in opposite directions along the sleeve portions 3a and 3b of the housing 3 and thence are deflected radially outwardly (arrows H and H') around the walls of housing 3 separating the cooling channels 11 from chambers 8 and 24 through 27. Finally, the cooling air passes axially (arrows J and J') to the radial openings 10c in the casing 10 to emerge from the hydrodynamic brake. The openings 10c are angularly equispaced about the casing 10 and lie in a transversed median plane P between the rotors 1, 2 and the shafts 28, 29.

To induce a flow of air through the channels 11, we provide a pair of blowers 12 and 13 at opposite axial ends of the channels which are driven by planetary gear systems to draw air into the opening 10a' or 10b' and force it in the direction of arrows H, H' and J, J' into contact with the walls of housing 3 through which heat exchange is effected. The blowers 12 and 13 have vanes 12b and 13b mounted upon disks 12c, 13c whose axially extending flanges 12d, 13d form crown gears which cooperate with a number of angularly spaced planetary gears 12e, 13e mounted upon an annular sleeve 12f, 13f carried by the respective shafts 28 and 29. Clamping rings 12g, 13g are threaded onto the opposite axial ends of the shafts to lock the sleeve 12f, 13f against shoulders 28b, 29b of these hollow shafts. The sleeve 12f, 13f is provided with an annular radially extending flange 12f', 13f carrying the shafts 12e', 13e' of the respective planetary gears 12e, 13e in angularly equispaced relationship. Bearing rings 43, 44 are interposed between the flanges 12d, 13d and the sleeves 12f, 13f to permit rotation of the blower wheels 12 and 13; these bearing rings may be babbit, other white metal or self-lubricating bearing of conventional design. The planetary gears 12e, 13e mesh with internal gears 12h, 13h mounted upon the sleeve portions 3a and 3b of the housing 3 and are thus non-rotatable. Thus upon rotation of the shafts 28 and 29 in opposite senses, the planetary gears 12e and 13e are rotatably entrained in the same sense and, since these gears mesh with the stationary internal gear 12h, 13h, the blades are driven in the opposite sense. The blower wheels 12c, 13c are thus rotated in the same sense as the shaft 28, 29 but at the highest speed determined by the transmission ratios of the planetary-gear transmissions 12d–12h and 13d–13h.

To enable control of the hydrodynamic brake, i.e. for selective activation and deactivation of the brake and regulation of the braking effectiveness, we form the rotors 1, 2 as axially effective piston-and-cylinder assemblies designed to axially advance the vanes 4, 5 and 6, 7 toward one another into most effective interaction or to retract them to reduce the brake effectiveness. Thus the vanes 4, 5 are carried by a piston disk 16 which is axially shiftable in a cylinder 18 of the rotor through the openings 22, 22' of which the vanes 4 and 5 extend. The disk 16 carries an O-ring 16a which cooperates with a fixed O-ring 16b to seal the chamber 18. Similarly, vanes 6, 7 are slidably received in slots 23 and 23' of a cylinder 19 of the rotor 2 and are carried by a piston disk 17 whose seals 17a and 17b are disposed as previously described. Hydraulic fluid is supplied under pressure to the cylinders 18 and 19 via fluid transmission tubes 31 and 32 which, in turn, communicate with forces 41 and 42 formed in the shafts 28, 29 and open at annular grooves 41a and 42a of the shafts, respectively. Registering with these grooves are fluid-distributing annular chambers 37 and 38 of conventional design which transfer a hydraulic fluid to the rotating shafts without permitting escape of the fluid. These units are supplied by tubes 39 and 40 mounted on the fixed housing 3. Against the force of the fluid in chambers 18, 19, springs 20 and 21 are effective, the springs being disposed in axially equispaced bores (FIG. 3) to act upon radial projections of the piston disks 16, 17 as represented at 16c, 17c in FIG. 2.

To compensate for the expansion of the hydrodynamic brake fluid as it becomes heated, chamber 27 is connected via a pressure-relief valve 34 with a reservoir 30, the pressure-relief valve being connected in parallel to a check valve 33 which permits fluid to return from the reservoir 30 to the pump when the pressure in chamber 34 falls. In addition, or alternatively, a charging tank may be provided which is connectable with the intake or exhaust sides of a compressor as shown at 30a and 30b when it is desired to control the brake effectiveness by the pressure within the pump chamber.

The apparatus operates in the following manner. When a brake-control member, e.g. brake pedal 50, is actuated, brake fluid is forced from the master cylinder 51 to the tubes 39, 40 of the hydraulic decelerator and as desired to a control member 52 of a valve 53 controlling the charging cylinder 30a. Simultaneously, or via differential valve systems as described in the above-mentioned co-pending applications and earlier patents, to the wheel brakes which function in the usual manner. The hydrodynamic brake fluid is thus admitted to the hydraulic decelerator and the pistons 16, 17 advance axially inwardly against the force of the spring 20 and 21. The hydrodynamic brake fluid should be a liquid which does not decompose or degenerate at temperature up to 200° C. As the vanes 4, 5 and 6, 7 mesh, the hydrodynamic brake fluid flowing along the closed path B–C–D–E–F and B'–C'–D'–E'–F' encounters the vanes which frictionally attack the liquid and produce heat, thereby raising the temperature of the liquid. Simultaneously, a frictional retardation of the rotors, which are coupled to the power shaft of the vehicle as previously indicated, slows the power train in proportion to the quantity of heat developed.

Simultaneously, blowers 12 and 13 induce air through the casing or jacket 10 in the direction of arrows G, H and J or G', H' and J' in heat-transferring relationship with the brake fluid through the wall of housing 3. Thus both the circulating pump and the heat exchanger are one unit. When the fluid pressure in chambers 18 and 19 is relieved, spring 20 and 21 bias the pistons 16 and 17 apart, thereby reducing the interaction of the vanes with the liquid and the amount of heat developed as well as the braking effectiveness. The rear surfaces of the rotors 1 and 2 may be provided with projecting pins or the like as shown at 55, 56 to increase the turbulence in chambers 26 and 27.

FIG. 4 shows a modified double-rotor hydrodynamic brake in which the stator housing 61 is of toroidal configuration and has a pair of axially extending opposite sleeves 61a and 61b carrying supporting bearings 62a and 62b in which a pair of axially extending splined shafts 63 and 64 are journaled. The shafts 63 and 64 are rotated in opposite senses as previously described. The toroidal chamber 65 (of annular section in an axial plane) within the housing 61 receives the rotors as will be apparent hereinafter. An array of stator blades 66 is mounted upon the inner wall of the housing 61 and is connected with an inner wall 67 which likewise extends toroidally around the axis A of rotation of the rotors. On the right hand side of the housing 61, there are provided arrays of interfitting generally axially extending blades 68, 69 and 70. The blades 69 are carried by a rotor body 71 in the form of a disk generally perpendicular to the axis A and mounted upon the shaft 64. The other rotor comprises a hub 73 which carries the angularly spaced vanes 68 to which the annular rotor shell 72 is attached. The vanes 68 and 70 are cantilevered on the shell 72. Thus the annular chamber 65 is formed around the torus axis X and the wall 67 to induce the pumping action of the fluid in the manner of an axially-inlet, radial-outlet pump. In the space between the vanes 68 and 70, the vanes 69 of the rotor 71 extend axially. The hub 73 is mounted upon an extension 63a of shaft 63 and has its free end rotatable relatively to the shaft 64 and journaled in a bearing 64 in the latter. Seals 75 and 76 prevent escape of the hydrodynamic brake fluid from the stator housing 61. A curved sheet metal strip 75 completes the annular or donut configuration (in section in an axial plane) of the chamber 65.

Within the space surrounded by wall 67, we provide a tubular slide 78 which has the configuration of a cylindrical ring and can be shifted in the direction of arrow Y along a screw thread 78a.

The slide 78 has an axially extending rim 78b which is designed to intercept the hydrodynamic fluid circulating through the annular chamber 10 when this rim projects into the circulating chamber through a window 82 in the wall 67. During such interception of the fluid, the liquid is conducted into the interior 78d of the toroidal chamber 67 where it assumes a quiescent condition and thereby reduces the effectiveness of hydrodynamic braking to a corresponding degree. Any convenient mechanism can be used to adjust the position of the member 78, such mechanism being represented as a Bowden line 83 operated by a lever 84 at the driver's position in the vehicle. The outer edge of the vanes 70 may be parallel to the generatrices of the rim or inclined thereto outwardly from the window on 82.

To dissipate thermal energy from the device, the housing 61 is provided with a multiplicity of angularly equispaced radially extending fins 85 lying in respective axial planes of the device, and with a shell 86 surrounding the fins 85 so as to define coolant channels therewith. At the left-hand open end of the shell 86, we provide a blower arrangement to induce a flow of air in heat-exchanging relationship with the housing 61 and the liquid circulating therein. The blower arrangement comprises a fan 87 which is rotatably mounted by a bearing 93 upon the housing sleeve 61a and has an internal ring gear 88 meshing with the planetary gears 94 angularly equispaced about the axis A. The planetary gears 94 are rotatably mounted upon respective shafts 89 of a planetary-gear carrier keyed at 91 to the splined shaft 63. The sun gear 92 meshes with the planetary gears 94 and is fixed to the sleeve portion 61a of the housing 61. In the region of the hub (screwthread 78a) the wall 67 may have another window unblocked in the retracted position of slider 78 to permit liquid to return to chamber 65.

In operation, the slider 78 is withdrawn to the left in FIG. 4 to permit the counter-rotating vanes 69 and 68, 70 to displace the liquid around the core chamber 67 through the chamber 65 without cavitation phenomena and with stepless adjustment of the flow cross-section via member 78. The interaction of the resulting vortex with the vanes and the stator fins 66 generates heat in proportion to the degree of hydrodynamic braking, the heat being dissipated by the air flow through the channels between fins 85. The chamber 67 thus retains the noncirculating portion of the liquid and acts to prevent pumping when braking is not required. In addition, stepless regulation is provided, the unit is highly compact and makes use of a limited number of parts which may be adversely affected by heat. The chamber 65 can be designed and dimensioned to minimize cavitation and may have the conveniences and conventional torque-converter systems.

The invention described and illustrated is believed to admit of many modifications within the ability of persons skilled in the art.

We claim:

1. A hydrodynamic brake for a vehicle having a body and wheel means, said hydrodynamic brake comprising housing means mounted on said body, a pair of co-operating rotors connected with said wheel means for rotation in opposite senses for circulating a hydrodynamic-brake liquid, and heat-exchanger means for dissipating heat developed in said liquid upon the braking of said wheel means, said housing means having a pair of oppositely extending axial sleeves, said rotors each having a respective hollow shaft rotatably journaled in one of said sleeves, said rotors each comprising a respective piston disk carrying at least two radially spaced annular arrays of vanes extending axially toward the opposing rotor and interleaved with the arrays thereof, a respective cylinder having slits passing the vanes and slidably receiving the respective piston disk, means for delivering an actuating fluid to the respective cylinder, and spring means bearing upon the respective piston disk in a direction opposite to the displacement of said disk by the actuating fluid introduced into the respective cylinder, said heat-exchanger means including a casing spacedly surrounding said housing means and having outwardly flared ends in the region of said sleeves, said casing defining with said housing means at least one channel from each of said outwardly flared ends along said housing means, and being provided with outlet means at a location intermediate said outwardly flared ends to permit escape of air from said channels, a pair of blower blades rotatable relatively to said sleeves and said shafts and coaxial therewith in said outwardly flared ends, and respective planetary gear means between said blower blades and the respective shafts and said housing means for driving said blower blades at rates in excess of the rates of rotation of the respective shafts, said housing means defining with said rotors liquid-circulating chambers including a first chamber between said rotors traversed by said vanes and communicating with the interiors of said shafts, a pair of axial second chambers communicating with said first chamber and extending away from one another, and a pair of third chambers extending radially toward said shafts behind the respective rotors, said shafts having throttling orifices communicating between said third chambers and the interiors of said shafts, said second and third chambers being provided with axially extending diffuser vanes on said housing means.

2. A hydrodynamic brake as defined in claim 1, further comprising means for inducing turbulence in said third chamber upon rotation of said rotors.

3. A hydrodynamic brake for an automotive vehicle having a body and wheel means, said hydrodynamic brake comprising a housing mounted on said body; a pair of co-operating rotors in said housing having interfittable sets of angularly spaced axially extending vanes axially shiftable toward and away from one another for rendering the brake effective and ineffective selectively; means connecting said rotors with said wheel means for rotation of said rotors in opposite senses whereby said rotors circulate a hydrodynamic-brake liquid upon such rotation with said sets of vanes interfitting; control means for axially shifting the sets of vanes of said rotors; and heat-exchanger means for dissipating heat developed in said liquid upon the braking of said wheel means.

4. The hydrodynamic brake as defined in claim 3 wherein said housing is provided with an inner wall enclosing said rotors and defining a liquid-circulating chamber, and an outer wall spacedly surrounding said inner wall and communicating at its axial ends with the atmosphere, and respective blade means operatively connected with said rotors and disposed at said ends for inducing a flow of air between said walls.

5. A hydrodynamic brake for a vehicle having a body and wheel means, said hydrodynamic brake comprising housing means mounted on said body, a pair of co-operating rotors connected with said wheel means for rotation in opposite senses for circulating a hydrodynamic-brake liquid, and heat-exchanger means for dissipating heat developed in said liquid upon the braking of said wheel means, said rotors having interfitting annular arrays of vanes engaging said fluid, each of said rotors being formed with an axially shiftable piston disk carrying the respective arrays of vanes, a respective annular cylinder slidably receiving the corresponding piston disk, means for feeding a fluid to the respective cylinder to displace said piston disks in the direction of the opposing rotor, and spring means for urging the respective piston disks away from the opposing rotor.

6. A hydrodynamic brake as defined in claim 5, further comprising a pressure relief valve connected with the interior of said housing means for permitting said liquid to flow therefrom upon expansion of the liquid with heating, and check-valve means in parallel with said pressure-relief valve to permit return of said liquid to the interior of said housing means.

7. A hydrodynamic brake as defined in claim 5 wherein said housing means is formed with angularly spaced radially inwardly projecting diffuser fins.

8. A hydrodynamic brake as defined in claim 5 wherein said rotors are carried by coaxial hollow shafts and said vanes are disposed between said rotors for engagement with said liquid emerging from said shafts, said housing means defining with said rotors chambers along said housing means for circulating said liquid through said hollow shafts between the vanes of said rotors and back to said hollow shafts, said heat exchanger means including a casing surrounding said housing means and forming coolant channels in heat-exchanging relationship with said liquid through said housing means.

9. A hydrodynamic brake as defined in claim 8, further comprising blower means at at least one end of said channels for inducing a flow of air through said casing.

References Cited

UNITED STATES PATENTS

| | | |
|---|---|---|
| 1,610,830 | 12/1926 | Walker. |
| 2,077,080 | 4/1937 | Tolman. |
| 2,491,329 | 12/1949 | O'Leary. |
| 2,498,572 | 2/1950 | O'Leary. |
| 2,548,299 | 4/1951 | Frankenstein. |
| 2,672,953 | 3/1954 | Cline. |
| 3,362,510 | 1/1968 | Nash. |

FOREIGN PATENTS

| | | |
|---|---|---|
| 466,436 | 5/1937 | Great Britain. |
| 589,790 | 6/1947 | Great Britain. |

GEORGE E. A. HALVOSA, Primary Examiner